Patented May 20, 1930

1,759,659

UNITED STATES PATENT OFFICE

ALWIN MITTASCH, OF LUDWIGSHAFEN-ON-THE-RHINE, CARL MÜLLER, OF MANNHEIM, AND WALTER SCHUBARDT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF PURE IRON

No Drawing. Application filed March 4, 1926, Serial No. 92,366, and in Germany May 23, 1925.

A process of producing pure iron metal by passing dilute vapors of iron carbonyl over heated solid bodies or through heated liquors or melts has been described elsewhere.

We have now found that the production of pure iron metal by decomposition of iron carbonyl can also be effected by introducing the iron carbonyl into a heated vessel in such a manner that the decomposition takes place substantially in the free space of the vessel instead of by contact with the heated walls of the vessel. According to this process the iron carbonyl is introduced in a liquid or vapor state at a considerable distance from the hot walls of the vessel, the size and shape of which are preferably so chosen that the surface of the walls is as small as possible in proportion to the containing part of the vessel, as is the case for example in a pipe of large internal diameter or in a ball-shaped vessel.

For example, the iron carbonyl is introduced by means of a nozzle into the upper end of a wide vertical pipe or vessel heated externally, the nozzle being of such shape as to cause the vapor or liquor particles to move not against the walls but in the direction of the axis of the pipe or vessel. The carbonyl is decomposed to carbon monoxide and finely dispersed iron which is conducted downwards by the gas current and which can be separated at the lower end of or outside the pipe or vessel by mechanical, electric, magnetic or other means.

The temperature of the decomposing vessel is preferably chosen between 100° C. and 400° C. On the one hand, the temperature must be high enough to effect a rapid and complete decomposition of the iron carbonyl passed through the vessel; otherwise the carbonyl would not only contaminate the iron, but might also cause subsequent ignition when air is allowed to have access. On the other hand, the temperature must not substantially exceed 400° C., as at higher temperatures the iron is oxidized by carbon monoxid according to the equation $Fe + CO = FeO + C$ and, moreover, carbon monoxid itself is largely decomposed to carbon and carbon dioxid: $2CO = C + CO_2$.

As these two reactions are to a large extent exothermic, while by the decomposition of iron carbonyl to iron and carbon monoxid heat is consumed, an occurrence of the undesirable reaction leading to a contamination of the iron by iron oxid and carbon, is soon indicated by the temperature in the vessel rising. The most suitable temperature for working depends on the concentration of the iron carbonyl, on the speed of the gas current and on the size and form of the vessel. Generally speaking, it is especially advantageous to work at about 250 to 300° C.

At very high temperatures, however, the said side reactions take place again to a smaller extent, that is to say, carbon monoxid becomes increasingly more stable in the presence of iron, and therefore the decomposition of the iron carbonyl can also be effected at very high temperatures of above about 900° C. In this case, it is necessary to prevent the iron from coming into contact with carbon monoxid for a longer time in the interval of temperature down to about 400° C. while cooling it, as it would otherwise subsequently be considerably contaminated by carbon.

The iron carbonyl may be mixed with inert or reducing gases. The decomposition may also be carried out at diminished pressure. By introducing small quantities of gases or vapors acting catalytically in the formation and also in the decomposition of iron carbonyl, as for example ammonia, the temperature of the decomposition can be reduced or the quantity decomposed in a given time in a vessel of a certain volume can be increased. The catalytic action not only of freshly produced, but also of specially introduced, finely divided iron on the decomposition of iron carbonyl may also be made use of.

According to this process generally an extraordinarily fine powder or iron in a very light flocculent spongy form of light gray coloor is obtained which on account of its purity and great surface may be used advantageously for many kinds of technical purposes. It is free from sulfur, phosphorus, silicon, arsenic as well as from copper, manganese and other metals, even from traces of these elements. The only possible impurities are nickel or cobalt, small quantities generally less than 0.6 per cent of carbon and, when oxidizing agents are not totally excluded, traces of combined oxygen which can be removed, if desired, by chemical or mechanical means. Carbon and oxygen can in some cases be removed simultaneously in the form of carbon monoxid by heating the iron to high temperatures, or to the melting point The iron obtained according to the present invention consists of particles having a rounded to ball-like shape. When a cross section of such particles after having been etched is observed under the microscope, a scaly structure is revealed. In some cases the single rounded particles of iron adhere together to form an extremely light product having the appearance of cotton wool.

For certain purposes the finely divided iron produced is advantageously separated from the gases leaving the furnace by passing them through an inert liquor or melt, for example melted paraffin wax, with which the iron forms a suspension. Or the bulk of the iron may be separated in any desired manner and only part of it by the modification just described.

We claim:

1. The process of manufacturing pure iron which comprises decomposing iron carbonyl in the hot free space of a heated vessel substantially at a distance from the hot walls of the vessel.

2. The process of manufacturing pure iron which comprises introducing iron carbonyl into the free space of a vessel heated to a temperature higher than 100 degrees, but not between about 400 and 900° C., substantially without bringing it into contact with the hot walls of the vessel.

3. The process of manufacturing pure iron which comprises introducing dilute iron carbonyl into the free space of a vessel heated to a temperature higher than 100 degrees, but not between about 400 and 900° C., substantially without bringing it into contact with the hot walls of the vessel.

4. As a new article of manufacture finely divided iron, obtained by decomposing iron carbonyl in the hot free space of a heated vessel substantially at a distance from the hot walls of the vessel, the single particles of which have a rounded to ball-like shape.

5. As a new article of manufacture finely divided iron, obtained by decomposing iron carbonyl in the hot free space of a heated vessel substantially at a distance from the hot walls of the vessel, the single particles of which have a rounded to ball-like shape and which in cross-section, after having been etched, reveal a scaly structure on microscopic examination.

6. As a new article of manufacture finely divided iron, obtained by decomposing iron carbonyl in the hot free space of a heated vessel substantially at a distance from the hot walls of the vessel, the single particles of which cohere to form an extremely light product having the appearance of cotton wool.

7. As a new article of manufacture finely divided iron, obtained by decomposing iron carbonyl in the hot free space of a heated vessel substantially at a distance from the hot walls of the vessel, the single particles of which cohere to form an extremely light product having the appearance of cotton wool, at least part of said single particles having a rounded to ball-like shape.

In testimony whereof we have hereunto set our hands.

ALWIN MITTASCH.
CARL MÜLLER.
WALTER SCHUBARDT.